(12) United States Patent
Kangru (10) Patent No.: US 8,441,935 B2
(45) Date of Patent: May 14, 2013

(54) METHOD AND APPARATUS TO DISTRIBUTE SIGNALING DATA FOR PARALLEL ANALYSIS

(75) Inventor: Per Kangru, Uppsala (SE)

(73) Assignee: JDS Uniphase Corporation, Milpitas, CA (US)

(*) Notice: Subject to any disclaimer, the term of this patent is extended or adjusted under 35 U.S.C. 154(b) by 1638 days.

(21) Appl. No.: 10/913,438

(22) Filed: Aug. 9, 2004

(65) Prior Publication Data

US 2006/0028992 A1 Feb. 9, 2006

(51) Int. Cl.
*G01R 31/08* (2006.01)

(52) U.S. Cl.
USPC ........... 370/236; 370/410; 370/426; 370/467; 370/496; 709/224

(58) Field of Classification Search .......... 370/241–253, 370/229–235, 236, 310, 310.1, 310.2, 467, 370/496; 709/223–226
See application file for complete search history.

(56) References Cited

U.S. PATENT DOCUMENTS

| | | | | |
|---|---|---|---|---|
| 5,375,159 A * | 12/1994 | Williams | .......................... | 379/23 |
| 6,178,235 B1 * | 1/2001 | Petersen et al. | ................ | 379/134 |
| 6,393,483 B1 * | 5/2002 | Latif et al. | ...................... | 709/226 |
| 6,873,617 B1 * | 3/2005 | Karras | ........................... | 370/389 |
| 6,981,035 B1 * | 12/2005 | Goldberg et al. | ............. | 709/223 |
| 7,164,657 B2 * | 1/2007 | Phaal | .............................. | 370/235 |
| 7,302,481 B1 * | 11/2007 | Wilson | .......................... | 709/224 |
| 7,480,244 B2 * | 1/2009 | Nguyen et al. | ................. | 370/235 |
| 7,496,111 B2 * | 2/2009 | Itzkovitz et al. | .............. | 370/467 |
| 7,590,725 B1 * | 9/2009 | Harrison | ........................ | 709/224 |
| 2002/0046273 A1 * | 4/2002 | Lahr et al. | ...................... | 709/224 |
| 2002/0176448 A1 * | 11/2002 | Sikdar | ........................... | 370/503 |
| 2003/0214971 A1 * | 11/2003 | Sheldon et al. | ................. | 370/467 |
| 2004/0013086 A1 * | 1/2004 | Simon et al. | .................... | 370/230 |
| 2004/0024859 A1 * | 2/2004 | Bloch et al. | .................... | 709/223 |
| 2005/0003842 A1 * | 1/2005 | Harju et al. | .................... | 455/502 |
| 2005/0025063 A1 * | 2/2005 | Grovenburg | .................. | 370/252 |
| 2006/0126526 A1 * | 6/2006 | Walsh et al. | .................. | 370/252 |
| 2007/0156917 A1 * | 7/2007 | Hunt et al. | ..................... | 709/232 |
| 2010/0091676 A1 * | 4/2010 | Moran et al. | .................. | 370/252 |

* cited by examiner

*Primary Examiner* — Christopher Grey
(74) *Attorney, Agent, or Firm* — Volentine & Whitt, PLLC (57) ABSTRACT

A method and apparatus for capturing signaling data exchanged across multiple interfaces of a network via a distributed network analyzer, selectively manipulating the captured signaling data for parallel real time distributed analysis by a plurality of signaling analyzers, and transmitting the selectively manipulated signaling data to each of the plurality of signaling analyzers for the parallel real time distributed analysis by the signaling analyzers. The transmitted signaling data includes at least one of network signalizing data, user signalizing data, and application signalizing data. Further, the captured signaling data analyzed by the signaling analyzers includes information needed for Quality of Service analysis of end user traffic. Accordingly, a method and apparatus for parallel real time distributed analysis of signaling data is provided, reducing complexity and cost of tools for analysis of signaling data.

21 Claims, 8 Drawing Sheets

METHOD AND APPARATUS TO DISTRIBUTE SIGNALING DATA FOR PARALLEL ANALYSIS

BACKGROUND OF THE INVENTION

1. Field of the Invention

The present invention relates to distributing signaling data of a network for analysis. More particularly, the present invention relates to capturing signaling data exchanged across multiple interfaces of a network and distributing the captured signaling data for parallel real time distributed analysis.

2. Description of the Related Art

Generally, analyzing signaling data of a network enables detection and troubleshooting problems within the network. In many cases, signaling data from various sources that are only available locally need to be captured and analyzed to pinpoint problems within the network. As networks become more complex, hardware and software as well as cost of implementing the hardware and software needed to capture and analyze signaling data increases.

Figure 1:
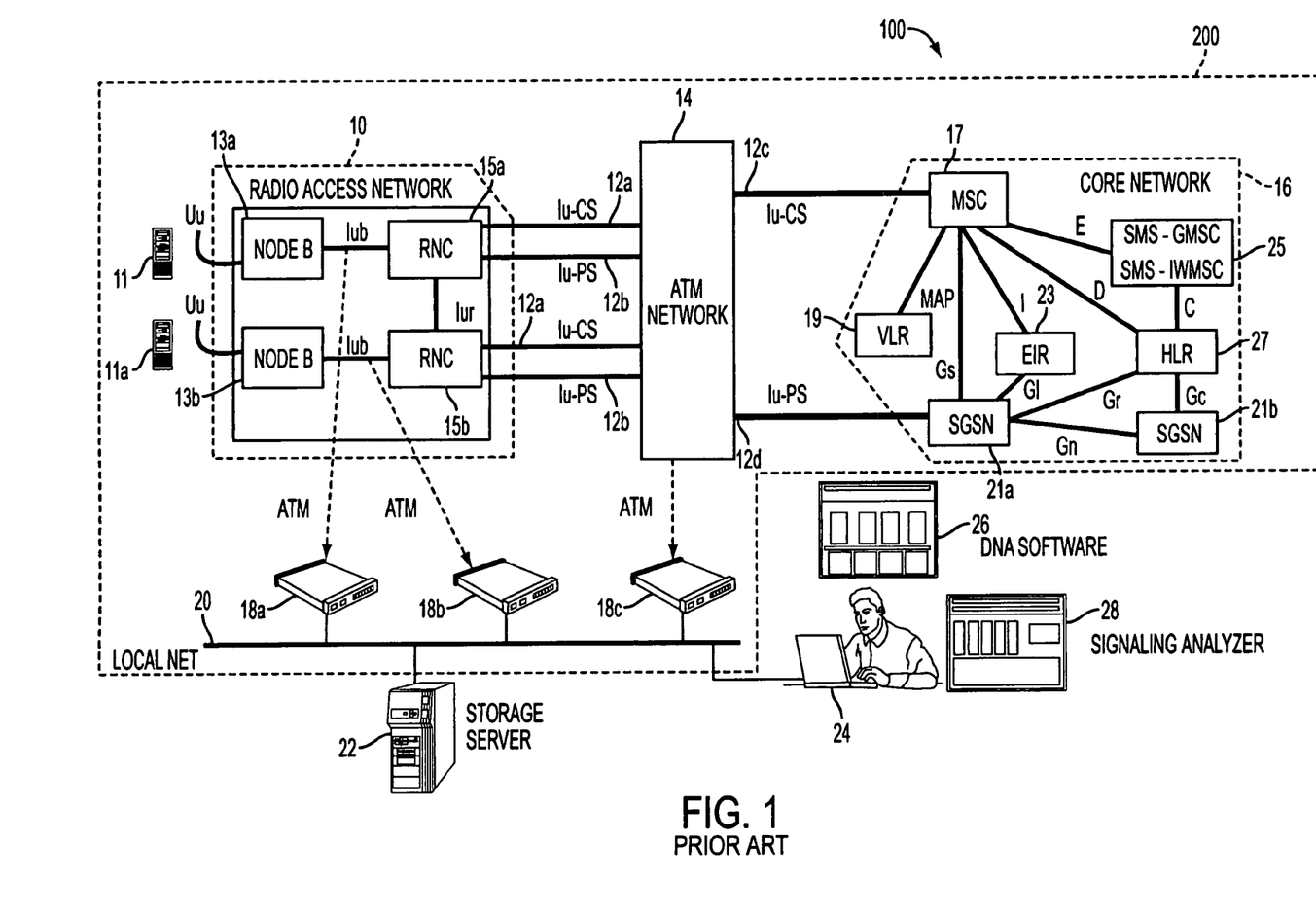
FIG. 1 is a diagram illustrating a typical signaling data analysis interface.

FIG. 1 shows a typical signaling data analysis interface 100. In FIG. 1, signaling data of a network 200 is analyzed based on the typical signaling data analysis interface 100. The general descriptions in relation to the network 200 of FIG. 1 are well known, and the signaling data refers to information concerned with establishment, control and management of data related to functions of the network 200.

Referring to FIG. 1, the network 200 includes a radio access network 10 that is connected to a core network 16 using an asynchronous transfer mode (ATM) network technology 14 where data cells or packets are exchanged between the radio access network 10 and the core network 16. The radio access network 10 having radio network controllers (RNCs) 15a and 15b is linked to the ATM network 14 via a known lu-CS (circuit switched) interface 12a and lu-PS (packet switched) interface 12b of a universal mobile telecommunications system (UMTS)(not shown). Each RNC is linked to a node B (13a and 13b in FIG. 1) based on the lub interface of the UMTS. Typically, node B refers to the function within the UMTS that provides a physical radio link between a user equipment (11 and 11a in FIG. 1) and the radio access network 10. Further, the user equipments 11 and 11a are interfaced with the radio access network 10 using a UMTS air interface (Uu in FIG. 1).

The core network 16 of the network 200 is interfaced with the ATM network 14 using a lu-CS (circuit switched) interface 12c and a lu-PS (packet switched) interface 12d. More specifically, the core network 16 comprises a mobile switching center (MSC) 17 for switching and exchanging data within the core network 16 that is interfaced with the ATM network 14 using the lu-CS (circuit switched) interface 12c, and a visitor location register (VLR) 19 having subscriber data that may be required for call handling and mobility management of subscribers. Also provided in the core network 16 are servicing a general packet radio support node (SGSN) (21a and 21b in FIG. 1) based on a general packet radio service (GPRS) that is generally known for keeping track of a location of a mobile station and performs security functions, etc. As shown in FIG. 1, the SGSN 21a in the core network 16 is interfaced to the ATM network 14 using the lu-PS (packet switched) interface 12d. The network 200 typically includes an equipment identity register (EIR) 23, a home location register (HLR) 27, short message service (SMS) 25, etc. for services such as categorically classifying mobile service, terminating signalling, providing traffic formats, converting protocols employed in mobile networks, etc.

As shown in FIG. 1, the typical signaling data analysis interface 100 has hardware components 18a, 18b and 18c correspondingly linked with the lub interface connecting each node B to the RNCs and the ATM network 14. The hardware components 18a, 18b and 18c capture signaling data exchanged within the network 200 and provide the signaling data for analysis using a local network 20 interface. The signaling data captured by the hardware components 18a, 18b and 18c can be stored in a storage server 22 and can be displayed to a user 24 using a distributed network analyzer software 26 providing ATM decoding and statistics information and a signaling analyzer 28 providing services, such as 3G call tracing, 3G decodes, etc.

The typical signaling data analysis 100 is limited to a one to one mapping of analysis hardware, such as the hardware components 18a, 18b and 18c, and analysis software tools similarly allocated as the distributed network analyzer software 26 and the and signaling analyzer 28. Specifically, the typical signaling data analysis 100 allows multiple interfaces to be connected to a single analysis session of the distributed network analyzer software 26 and the and signaling analyzer 28 but does not allow multiple interfaces to be connected to multiple analysis sessions. Accordingly, in a case where simultaneous analysis sessions need to be implemented, the typical signalling data analysis 100 requires implementation of multiple analysis hardware and software tools individually, increasing the complexity and cost of analysis tools.

Accordingly, it is important to provide users with analysis tools that allow the users to simultaneously run signaling data analysis sessions. As mentioned above, this becomes especially important as networks become increasingly complex and require capturing and analyzing signaling data from various sources. The use of the typical signaling data analysis prevents users from simultaneously analyzing signaling data and requires the users to setup the analysis sessions when there is a need to use the signaling data for multiple functions.

SUMMARY OF THE INVENTION

The present invention provides a method of capturing signaling data exchanged across multiple interfaces of a network via a distributed network analyzer, selectively manipulating the captured signaling data for parallel real time distributed analysis by a plurality of signaling analyzers, and transmitting the selectively manipulated signaling data to each of the plurality of signaling analyzers for the parallel real time distributed analysis by the signaling analyzers.

The present invention also provides a method of capturing signaling data across multiple interfaces including interfaces using multiple protocols via a distributed network analyzer, distributing the captured signaling data to a plurality of signaling analyzers in parallel for independent analysis, and analyzing and displaying the captured signaling data based on a user's request.

Moreover, the present invention provides a network analyzer including a distributed network analyzer capturing signaling data across multiple interfaces including interfaces using different protocols and selectively transmitting the captured signaling data, and a plurality of signaling analyzers receiving the transmitted signaling data and independently analyzing the received signaling data in parallel.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the present embodiments of the present invention, examples of which are illustrated in the accompanying drawings, wherein like reference numerals refer to the like elements throughout. The embodiments are described below to explain the present invention by referring to the figures.

FIG. 2 through FIG. 6 include the network 200 as described in relation to FIG. 1. However, the network 200 is not limited to the general description in FIG. 1 and it is understood that the network 200 may comprise other components and services of a network.

Figure 2:
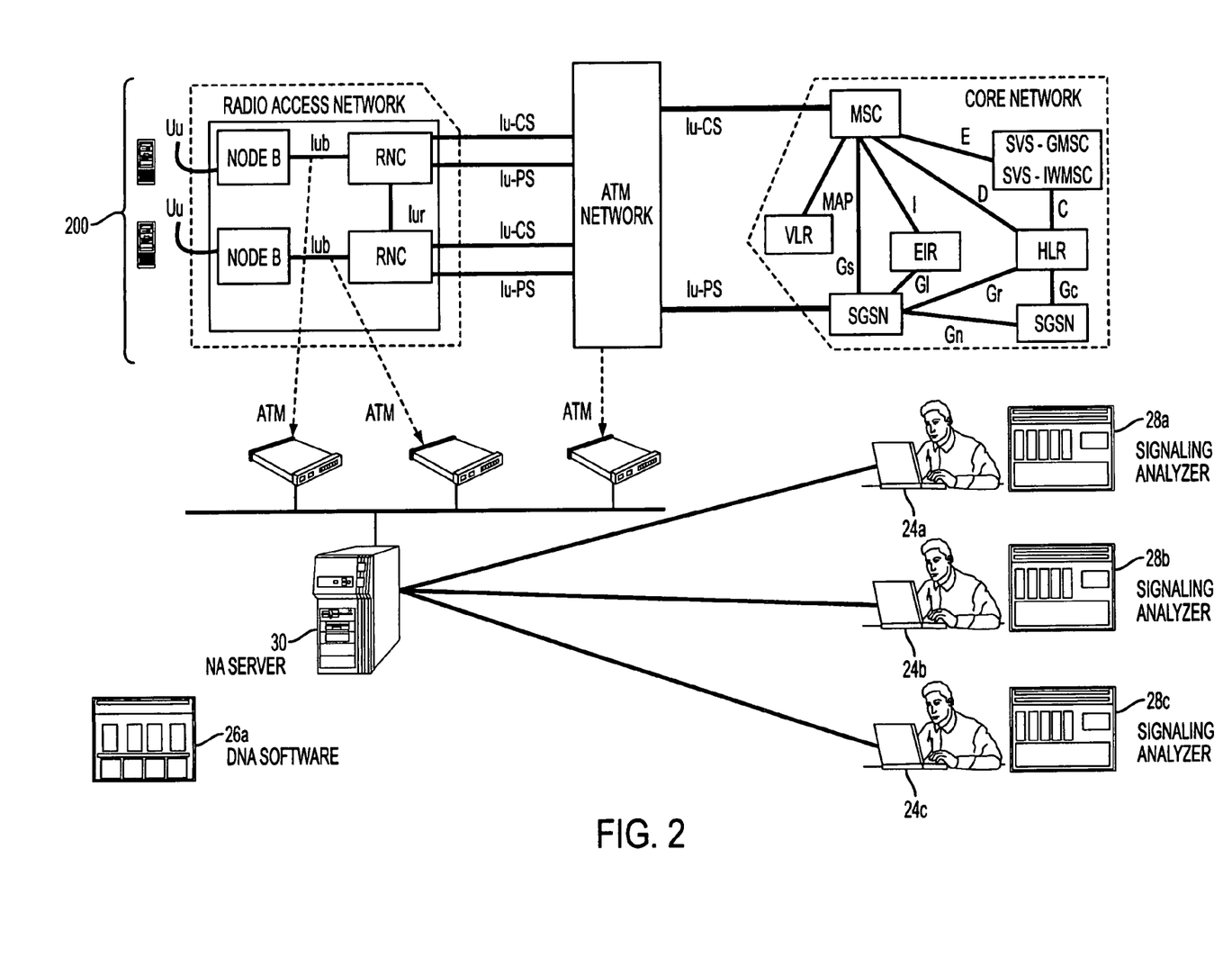
FIG. 2 is a diagram illustrating a single function network analyzer allowing multiple users to analyze the signaling data in parallel, according to an embodiment of the present invention.

Referring to FIG. 2, the network 200 is interfaced with a network analyzer (NA) server 30 and communicates with the network analyzer (NA) server 30. A distributed network analyzer (DNA) software 26a is provided to the network analyzer 30. Further, as shown in FIG. 2, multiple users 24a, 24b and 24c are enabled to implement multiple analysis sessions using signaling analyzers 28a, 28b and 28c. This enables distribution of the signaling data to the multiples users 24a, 24b and 24c for real time analysis in parallel by the signaling analyzers 28a, 28b and 28c. The distributed network analyzer software 26a selectively manipulates or tailors the signaling data based on the needs of the multiple users 24a, 24b and 24c. According to an aspect of the present invention, the signaling data can include, for example, network signaling data, such as messages used by a communications network to setup and control the functions of the network. The signaling data can also include, for example, user signaling data, such as information related to initiation of a session by a user to make a phone call, setup, connection, etc., and application signaling data such as information used by applications to communicate with either other applications or a user. For example, the signaling data can include information regarding establishment, control, connection and management in a network based on a 3G mobile communications technology over communication protocols such as the IEEE-802.11, Bluetooth™, CDMA, GSM, Mobile SS7, etc. However, the signaling data is not limited to any specific type of signaling data, or any specific protocol. The signaling data can be captured using known data capturing methods and devices.

As shown in FIG. 2, based on a configuration of the distributed network analyzer software 26a provided to the network analyzer server 30, the signaling data from the network 200 is distributed to the multiple users 24a, 24b and 24c. The implementation of the distributed network analyzer software 26a as shown in FIG. 2 eliminates the one to one mapping limitation between capture hardware and analysis software discussed in relation to FIG. 1. The multiple signaling analyzers 28a, 28b and 28c are used for multiple analysis of signaling data from the network 200 distributed by the distributed network analyzer software 26a. While the network analyzer server 30 is described as having one distributed network analyzer software 26a, the network analyzer server 30 can include more than one distributed network analyzer software 26a, providing scalable analysis of signaling data. For example, the distributed network analyzer software 26a can be configured to communicate with other distributed network analyzers to adapt to increased signaling data analysis demands.

Figure 3:
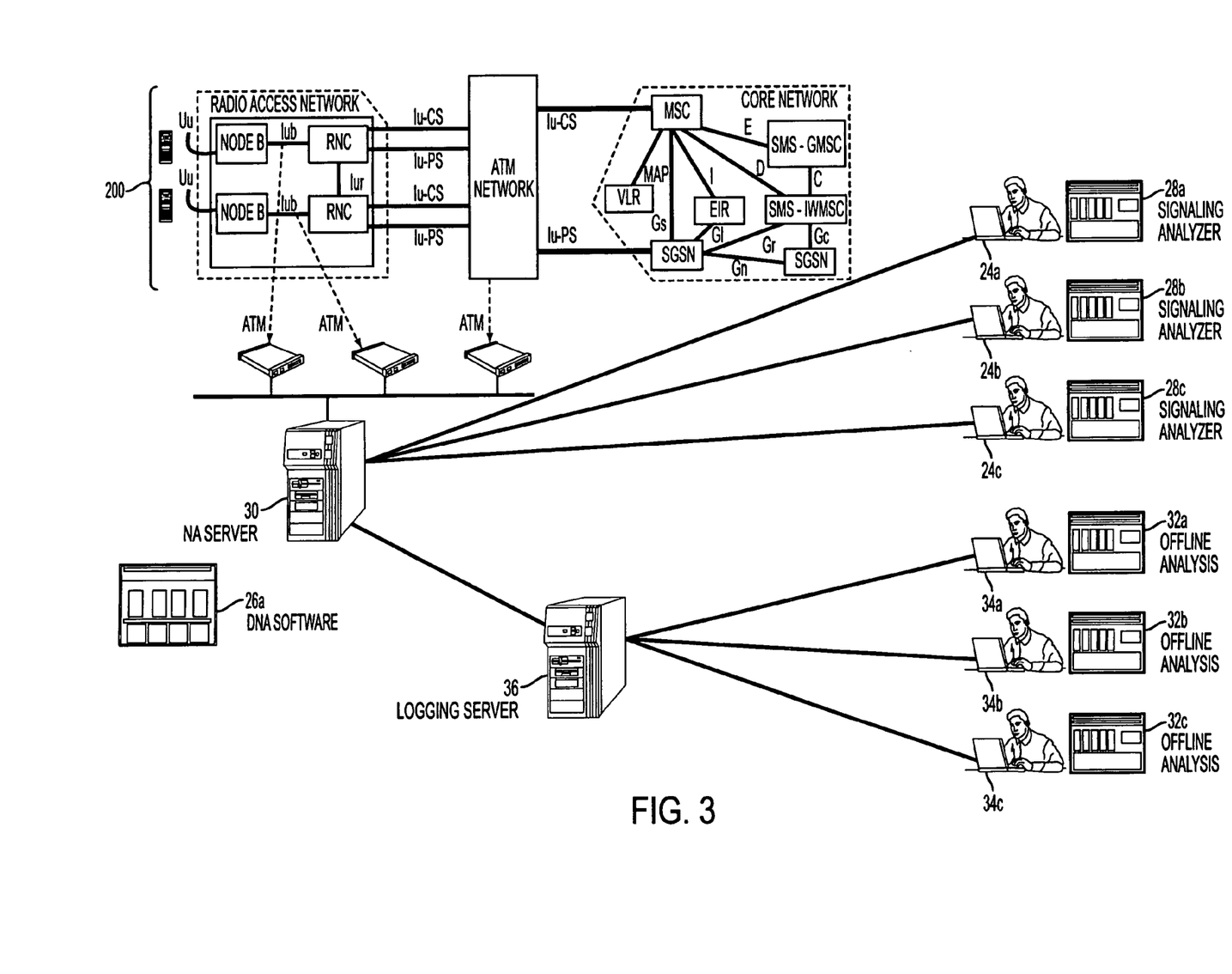
FIG. 3 is a diagram illustrating a multi-function network analyzer allowing multiple users to analyze the signaling data in parallel, according to an embodiment of the present invention.

In FIG. 3, the network 200 is interfaced with a network analyzer server 30 for communication with the network analyzer server 30. The distributed network analyzer software 26a is provided to the network analyzer 30. Further, multiple users 24a, 24b and 24c run multiple analysis sessions using signaling analyzers 28a, 28b and 28c as described in relation to FIG. 2. As shown in FIG. 3, the signaling data is registered to a logging server 36 to enable multiple offline analysis 32a, 32b and 32c of the signaling data by offline users 34a, 34b and 34c. The network analyzer 30 is interfaced with the logging server 36 enabling the multiple offline analysis 32a, 32b and 32c of the signaling data by offline users 34a, 34b and 34c to be implemented while also allowing real time analysis of signaling data by the multiple users 24a, 24b and 24c that run multiple analysis sessions in parallel using signaling analyzers 28a, 28b and 28c. This allows multiples users 24a, 24b and 24c to conduct multiple real time functions and the multiple offline analysis 32a, 32b and 32c to conduct multiple offline analysis using the same signaling data from the network analyzer server 30. This also allows the logging server 36 to function as a client and receive signaling data from the network analyzer server 30, and also distribute the signaling data to the multiple offline analysis 32a, 32b and 32c.

Figure 4:
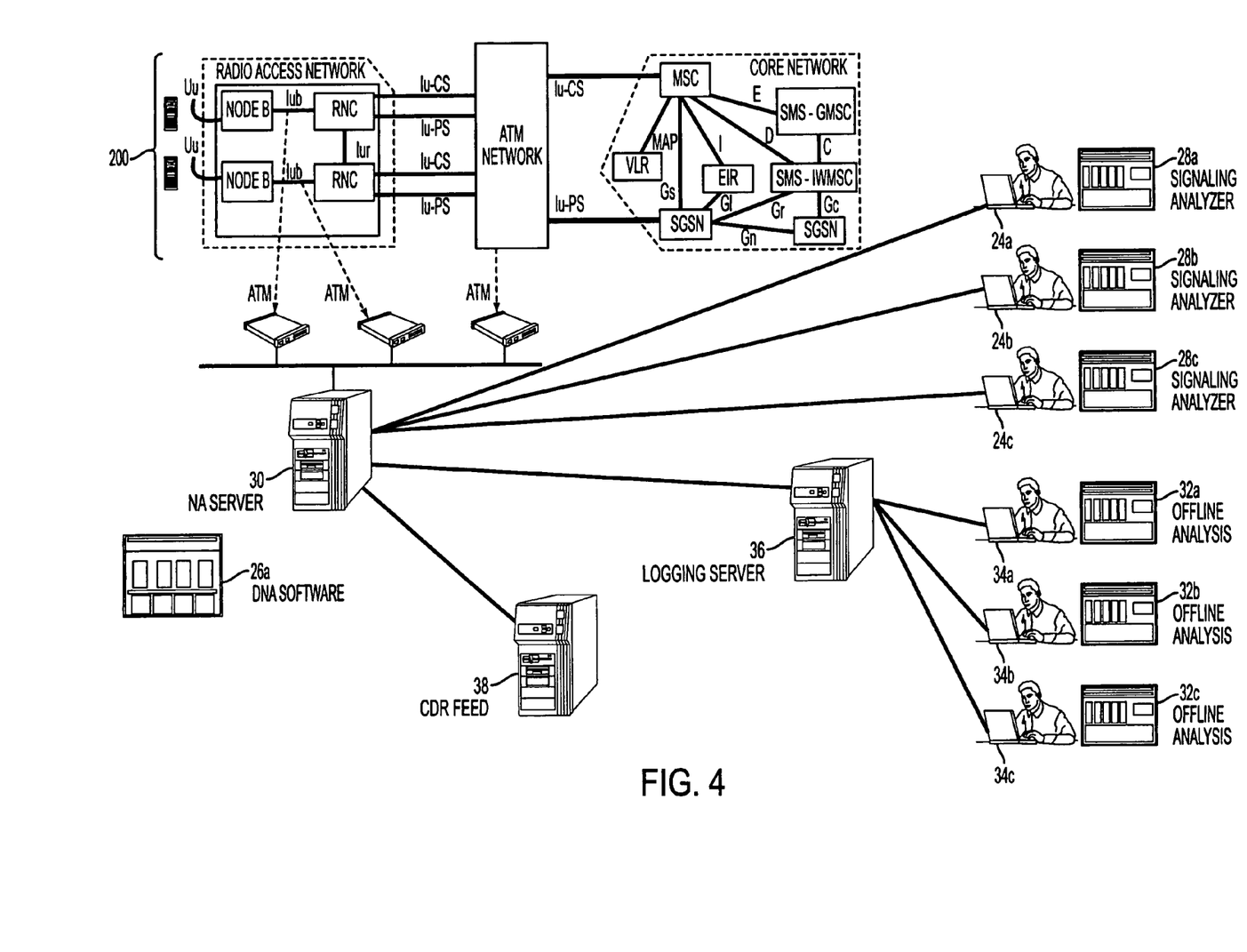
FIG. 4 is a diagram illustrating a multi-function network analyzer allowing multiple users to analyze the signaling data in parallel, according to another embodiment of the present invention.

Referring to FIG. 4, the network 200 is interfaced with a network analyzer server 30 and communicates with the network analyzer server 30. Further, the network analyzer server 30 is interfaced with the logging server 36 as described in relation to FIG. 3. In addition, as shown in FIG. 4, the network analyzer server 30 is linked to a call detail record (CDR) feed 38. The CDR includes data records information including information related to a telephone call, such as origination/destination addresses of the call, the time the call started and ended, etc. This enables the multiples users 24a, 24b and 24c and the multiple offline analysis users 34a, 34b and 34c to conduct simultaneous analysis of the signaling data including functions using the CDR.

Figure 5:
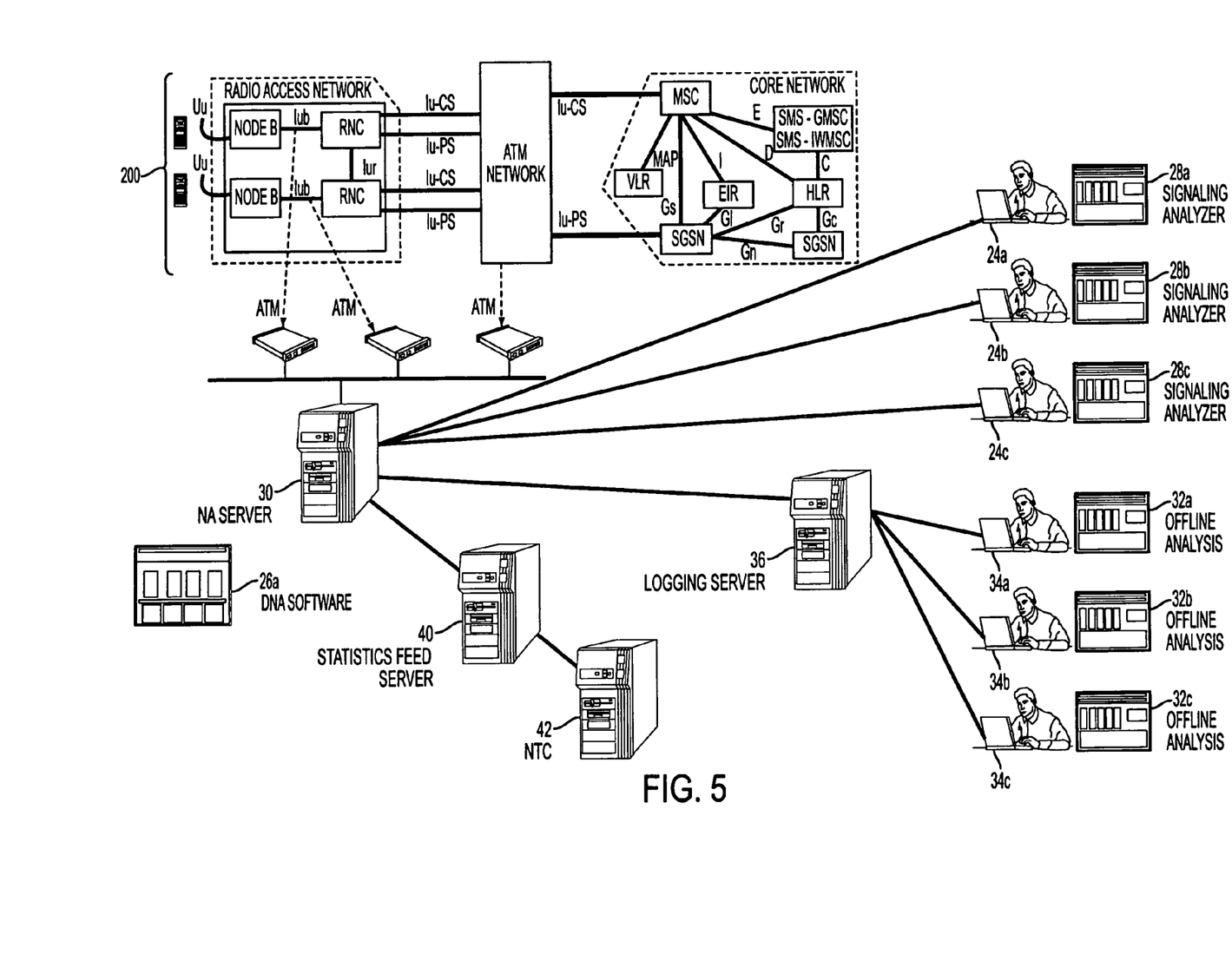
FIG. 5 is a diagram illustrating a multi-function network analyzer allowing multiple users to analyze the signaling data in parallel, according to another embodiment of the present invention.

In FIG. 5, the network 200 is interfaced with a network analyzer server 30 and communicates with the network analyzer server 30, and the network analyzer server 30 is interfaced with a logging server 36 as described in relation to FIG. 4. In addition, the network analyzer server 30 of FIG. 5 is connected with a statistics feed server 40 and an NTC 42. Accordingly, the multiples users 24a, 24b and 24c are able to conduct multiple real time analysis and the multiple offline analysis users 34a, 34b and 34c are able to implement parallel offline analysis. Further, the multiples users 24a, 24b and 24c and the multiple offline analysis users 34a, 34b and 34c receive data from the statistics feed server 40 and the NTC 42 for parallel real time and offline analysis using the data therefrom. This eliminates the need to setup analysis sessions individually when users need to perform multiple analysis functions.

Figure 6:
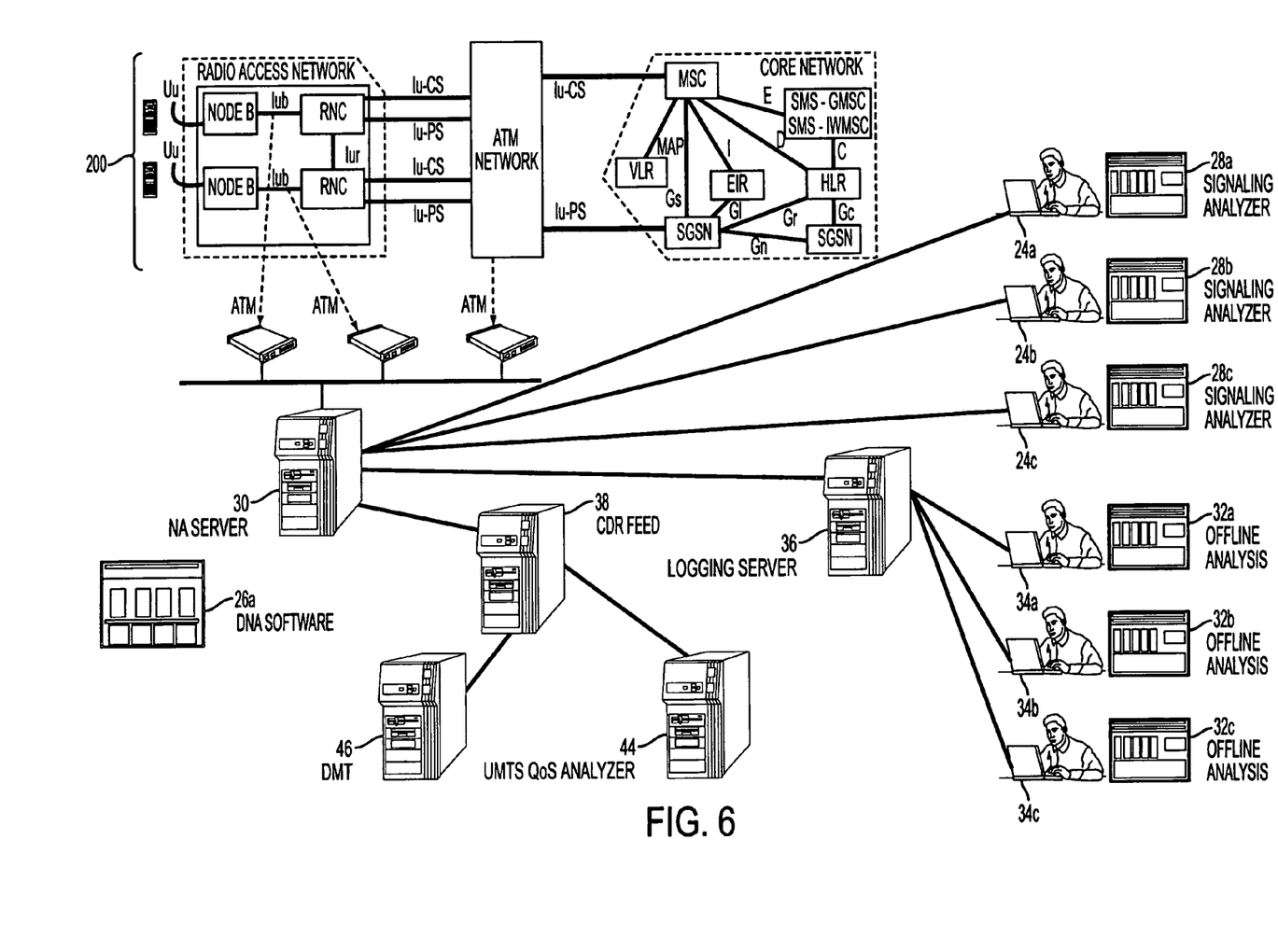
FIG. 6 is a diagram illustrating a multi-function network analyzer allowing multiple users to analyze the signaling data in parallel, according to another embodiment of the present invention.

Referring to FIG. 6, the network 200 is interfaced with a network analyzer server 30 for communication, and the network analyzer server 30 is interfaced with a logging server 36 as described in relation to FIG. 5. In addition, the network analyzer server 30 of FIG. 6 is connected with the CDR feed 38, which in turn is connected with a DMT 46 and a UMTS QoS analyzer 44. It is understood that UMTS QoS analyzer 44 refer to analysis of information related to performance of a communications system or channel, such as signal to noise ratio, bit error ratio, and DMT 46 relates to a Bluetooth™ link. This enables simultaneous analysis sessions to be run by the multiples users 24a, 24b and 24c and the multiple offline analysis users 34a, 34b and 34c using the captured signaling data by the network analyzer server 30 including information needed for Quality of Service analysis of end user traffic information. According to an aspect of the present invention, the transmitted signaling data includes at least one of network signalizing data, user signalizing data, and application signaling data. Further, the signaling data can be used for troubleshooting problems on a network and for optimizing the network.

Figure 7:
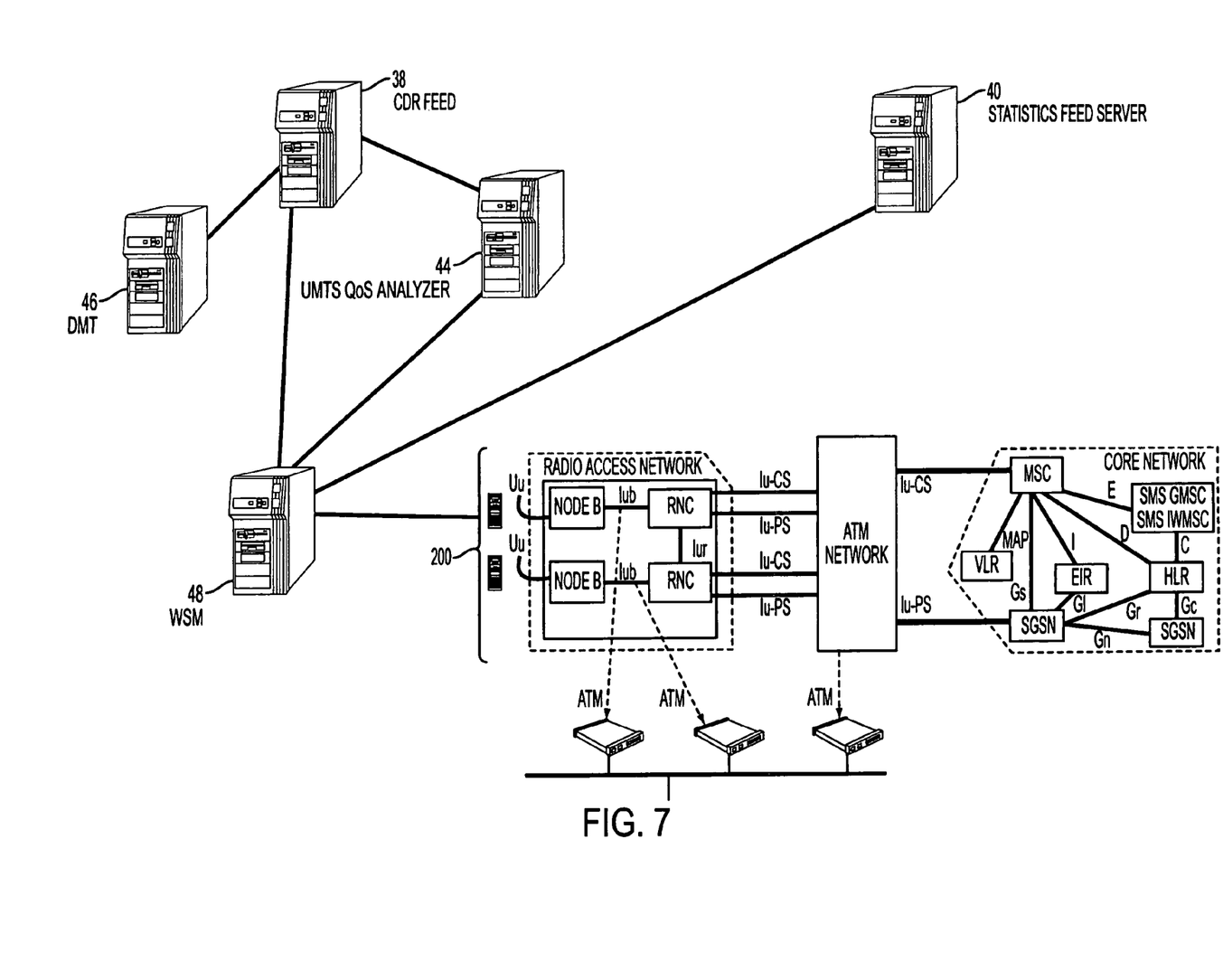
FIG. 7 is a diagram illustrating a wireless service manager, according to an embodiment of the present invention.

Referring to FIG. 7, the network 200 is interfaced to communicate with the DMT 46, the CDR feed 38, UMTS QoS analyzer 44, and the statistics feed server 40 via a WSM 48. This allows signaling data including various information concerned with multiple functions of the network 200 to be simultaneously analyzed. The reference to different source servers in relation to FIG. 7 are known.

Figure 8:
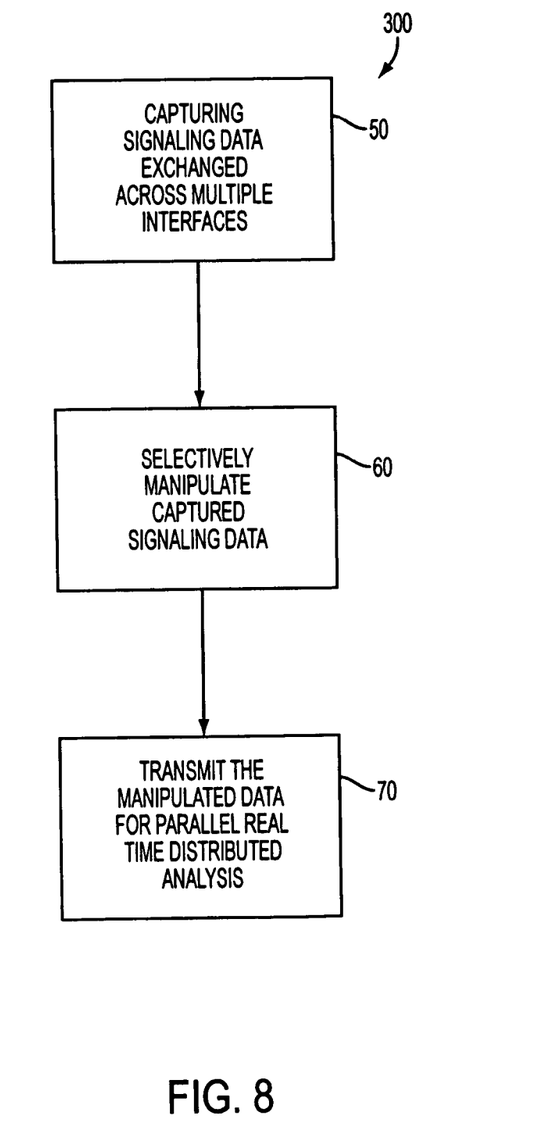
FIG. 8 is a diagram illustrating a method of capturing, selectively manipulating and transmitting signaling data exchanged across multiple interfaces, according to an embodiment of the present invention.

FIG. 8 illustrates a method of capturing, selectively manipulating and transmitting signaling data exchanged across multiple interfaces 300 according to an embodiment of the present invention. At operation 50, signaling data exchanged across multiple interfaces of a network is captured via a distributed network analyzer. From operation 50, the process 300 moves to operation 60, where the captured signaling data is selectively manipulated for parallel real time distributed analysis by a plurality of signaling analyzers. From operation 60, the process 300 moves to operation 70, where the selectively manipulated signaling data is transmitted to each of the plurality of signaling analyzers for the parallel real time distributed analysis by the signaling analyzers. In some embodiments, the signaling data is transmitted to each of the plurality of signaling analyzers sequentially for further analysis. Accordingly, the method 300 of the present invention allows parallel real time distributed analysis of the signaling data by the signaling analyzers without requiring individual setup of analysis For example, Agilent™ J6801A distributed network analyzer can be used for real time extraction of the signaling data and distribution of the signaling data. Further, Agilent™ signaling analyzer software, such as the J7326A, can be used for the parallel analysis of the signaling data. While the network analyzer server 30 and signaling analyzer 28 is described using Agilent™ products, the present invention is not limited to use by Agilent™ products.

Accordingly, a method and apparatus for distributing signaling data captures signaling data exchanged across multiple interfaces of a network via a distributed network analyzer, selectively manipulates the captured signaling data for parallel real time distributed analysis by a plurality of signaling analyzers, and transmits the selectively manipulated signaling data to each of the plurality of signaling analyzers for the parallel real time distributed analysis by the signaling analyzers. This enables distribution of the captured signaling data to the signaling analyzers for multiple parallel analysis of the captured signaling data. Further, this provides an analysis of signaling data that is not limited to a one to one mapping between hardware and software analysis tools, thereby enabling a non-complex analysis method and apparatus for analyzing signaling data of complex networks. This also allows selective distribution of the captured signaling data to each of the signaling analyzers to implement parallel analysis by the signaling analyzers.

The present invention also provides a method for capturing signaling data across multiple interfaces including interfaces using multiple protocols via a distributed network analyzer, distributing the captured signaling data to a plurality of signaling analyzers in parallel for independent analysis, and analyzing and displaying the distributed signaling data by the signaling analyzers based on a user's request. This provides signaling data that is tailored to the needs of users to be provided for distributed signaling data by the signaling analyzers.

Further, the present invention provides deciphered signaling data to allow users to easily understand the signaling data for efficient analysis of the same. The signaling data also includes at least one of network signalizing data, user signalizing data, and application signaling data that allow users to troubleshoot possible problems on a network and determine status of the network.

Additionally, the present invention provides a network analyzer including a distributed network analyzer capturing signaling data across multiple interfaces including interfaces using different protocols and selectively transmitting the captured signaling data, and a plurality of signaling analyzers receiving the transmitted signaling data and independently analyzing the received signaling data in parallel. This allows the signaling analyzers to implement parallel analysis sessions using the signaling data captured via the distributed network analyzer.

Although a few embodiments of the present invention have been shown and described, it will be appreciated by those skilled in the art that changes may be made in these embodiments without departing from the principles and spirit of the invention, the scope of which is defined in the appended claims and their equivalents.

Various protocols are described herein. However, the present invention is not limited to any specific protocols.

What is claimed is:

1. A method, comprising:
   capturing signaling data of a network, the signaling data being exchanged using multiple protocols between devices of the network across multiple interfaces, each interface extending between corresponding pairs of the devices of the network;
   receiving the captured signaling data at a network analyzer server;
   executing a plurality of independent real-time signaling analysis sessions, each of the independent real-time analysis sessions performing a corresponding real-time analysis of the captured signaling data via a corresponding signal analyzer that is connected to the network analyzer server, the plurality of independent real-time analysis sessions being performed independently of each other and at a same time as each other;

at the network analyzer server, selecting and processing the captured signaling data for each of the plurality of independent real-time analysis sessions to tailor the captured signaling data for each of the plurality of independent real-time analysis sessions, including deciphering the captured signaling data based on information related to the multiple protocols; and transmitting the selected and processed captured signaling data for each of the plurality of independent real-time analysis sessions from the network analyzer server to the corresponding signaling analyzer.

2. The method according to claim 1, wherein the transmitted signaling data includes user signaling data.

3. The method according to claim 1, wherein the signaling data is transmitted to each of the plurality of signaling analyzers sequentially for the parallel real time analysis by the signaling analyzers.

4. The method according to claim 1, wherein the captured signaling data includes information needed for Quality of Service analysis of end user traffic.

5. The method according to claim 1, wherein the captured signaling data includes network information related to wireless and wired networks.

6. The method according to claim 5, wherein the signaling data is displayed via a graphical user interface by the signaling analyzers.

7. The method of claim 1, wherein capturing the signaling data of the network, comprises capturing the signaling data using a plurality of hardware components, each hardware component being connected to a corresponding one of the interfaces, and wherein the method further comprises communicating the captured signaling data from the hardware components to the network analyzer server.

8. A method, comprising:
capturing signaling data of a network that is exchanged between devices of the network across multiple interfaces using multiple protocols, each interface extending between corresponding pairs of the devices of the network;

providing the captured signaling data to a network analyzer server for selectively distributing the captured signaling data;

employing the network analyzer server to selectively distribute the captured signaling data in parallel to a plurality of signaling analyzers connected to the network analyzer server for independent analysis of the signaling data; and at each of the plurality of signaling analyzers, in response to a request by a corresponding user, analyzing and displaying the selectively distributed signaling data, wherein selectively distributing the captured signaling data to the plurality of signaling analyzers comprises deciphering the captured signaling based on information related to the multiple protocols.

9. The method according to claim 8, wherein the analyzed signaling data includes network information related to wireless and wired networks.

10. The method according to claim 9, wherein the plurality of signaling analyzers to which the captured signaling data is distributed in parallel are located within various types of networks.

11. The method according to claim 10, wherein the captured signaling data is analyzed offline.

12. The method according to claim 11, wherein the captured signaling data is distributed to each of the plurality of signaling analyzers sequentially for further analysis.

13. The method of claim 8, wherein capturing the signaling data of the network comprises capturing the signaling data using a plurality of hardware components, each hardware component being connected to a corresponding one of the interfaces, and wherein providing the captured signaling data to the network analyzer server comprises communicating the captured signaling data from the hardware components to the network analyzer server.

14. A system, comprising:
a network analyzer server configured to receive signaling data captured across multiple interfaces of a network, each of which interfaces extends between two devices of the network, including interfaces using different protocols; and a plurality of signaling analyzers each connected to the network analyzer server, each of the signaling analyzers executing a corresponding analysis session for analyzing the captured signaling data in real-time, the plurality of analysis sessions being performed in parallel with each other, wherein the network analyzer server selects and processes the captured signaling data to tailor the captured signaling data for each of the plurality of analysis sessions, including deciphering the captured signaling data that is exchanged across the multiple interfaces based on information related to the different protocols, and transmits the selected and processed captured signaling data for each of the plurality of analysis sessions to the corresponding signaling analyzer.

15. The system of claim 14, wherein statistical information related to the signaling data of the multiple interfaces is selectively displayed by at least one of the signaling analyzers.

16. The system of claim 14, wherein the transmitted signaling data includes at least one of network signalizing data, user signalizing data, and application signaling data.

17. The system of claim 16, wherein the signaling data includes information needed for Quality of Service analysis of end user traffic.

18. The system of claim 17, wherein the signaling data is captured and analyzed remotely.

19. The system of claim 14, further comprising:
a logging server connected to the network analyzer server to log the captured signaling data; and a second plurality of signaling analyzers each connected to the network analyzer server, each of the signaling analyzers executing a corresponding offline analysis session for analyzing the captured signaling data offline, the plurality of offline analysis sessions being performed in parallel with each other.

20. The system of claim 14, wherein the network analyzer server further comprises an interface to a call detail record server for receiving information pertaining to a telephone call made via the network, the information including an origination address for the call, a destination address for the call, a time that the call started, and a time when the call ended.

21. The system of claim 14, further comprising a plurality of hardware components, each hardware component being connected to a corresponding one of the interfaces, wherein the hardware components communicate the captured signaling data to the network analyzer server.

* * * * *